United States Patent Office 3,516,946
Patented June 23, 1970

3,516,946
PLATINUM CATALYST COMPOSITION FOR
HYDROSILATION REACTIONS
Frank J. Modic, Scotia, N.Y., assignor to General Electric
Company, a corporation of New York
No Drawing. Filed Sept. 29, 1967, Ser. No. 671,558
Int. Cl. C07f 7/02; C08g 47/02
U.S. Cl. 252—429                                            4 Claims

ABSTRACT OF THE DISCLOSURE

Platinum compound-organocyclopolysiloxane catalyst compositions are prepared by reacting a platinum chloride-olefin complex with a cyclic alkylvinylsiloxane under conditions which remove the olefin from the reaction mixture to produce a new composition useful in reacting a first siloxane containing Si—H groups with a second siloxane containing silicon-bonded vinyl or allyl radicals. The reaction between such siloxanes is useful in the preparation of silicone elastomers and potting compositions.

This invention relates to new platinum compound catalysts and the use of such catalysts in hydrosilation reactions.

More particularly, this invention is directed to platinum compound-organocyclopolysiloxane catalyst compositions and to the use of such compositions for increasing the molecular weight of a mixture of at least two organopolysiloxanes, one of which contains silicon-bonded hydrogen atoms and at least one of which contains silicon-bonded vinyl radicals or allyl radicals.

It is known in the art that platinum or platinum-containing materials will catalyze the addition of silicon-bonded hydrogen atoms across the double bonds of compounds containing olefinic unsaturation. For example, Pat. No. 2,970,150—Bailey shows the use of platinum-on-charcoal catalysts for such hydrosilation reactions. Pat. No. 2,823,218—Speier et al. shows the use of chloroplatinic acid for these same types of reactions. While both platinum-on-charcoal and chloroplatinic acid are useful for many reactions, they suffer a number of disadvantages. Thus, both of these catalysts are subject to poisoning in the presence of a number of common materials and neither of these materials exhibits a satisfactory degree of solubility in either hydrocarbon compounds or organopolysiloxanes. Furthermore, neither of these catalysts is as active as desired. The disadvantages of elemental platinum and chloroplatinic acid with respect to poisoning and speed of reaction are overcome by the use of the platinum compound catalysts prepared by reacting chloroplatinic acid with alcohol, aldehydes, or ether, as shown in Pat. No. 3,220,972—Lamoreaux and by the use of the platinum-olefin catalysts shown in Pat. Nos. 3,159,601 and 3,159,662—Ashby. An even faster and more active catalyst is described and claimed in the copending application of Bruce D. Karstedt, Ser. No. 598,216, filed Dec. 1, 1966, and assigned to the same assignee as the present invention. The catalyst of the Karstedt application is prepared by reacting a platinum halide or platinum halide complex with an unsaturated organosilicon compound under reaction conditions such that the halogen in such complex is reduced to no more than one halogen atom per platinum atom.

While the various catalysts of the Lamoreaux patent, the Ashby patents and the Karstedt application eliminate the poisoning and low activity problems associated with elemental platinum or chloroplatinic acid, it is found that in some cases these improved catalysts are so active that the shelf life of compositions containing these catalysts is not as high as desired and, therefore, only small amounts of catalyzed compositions using these highly active catalysts can be prepared at one time. While these catalysts are extremely useful in effecting various SiH-olefin addition reactions, the art has long felt the need for a catalyst of activity between the high activity of certain of the catalysts and the moderately low activity of others.

An object of the present invention is to provide a catalyst for SiH-olefin addition reactions of intermediate reactivity.

A further object of this invention is to provide a catalyst for hydrosilation reactions which has an increased shelf life in contact with the components of the hydrosilation reaction and which resists poisoning by components which tend to poison certain prior art platinum compound or elemental platinum catalysts.

These and other objects of my invention are accomplished by a platinum compound-organocyclopolysiloxane composition prepared by reacting a platinum chloride-olefin complex having the formula:

(1) $[PtCl_2 \cdot Olefin]_2$ or the formula:

(2) $H[PtCl_2 \cdot Olefin]$ with a cyclic alkylvinylpolysiloxane having the formula:

(3) $[(CH_2{=}CH)(R)SiO]_n$ where the olefinic portion of the complex of Formulas 1 and 2 can be almost any type of olefin, but preferably is an alkene having from 2 to 5 carbon atoms, a cycloalkene having from 5 to 7 carbon atoms, or styrene, where R represents a lower alkyl radical, e.g., an alkyl radical containing from 1 to 7 carbon atoms, and $n$ is an integer equal to from about 3 to 5, inclusive, and preferably is equal to 4. As will be described in more detail hereinafter, the reaction between the platinum-olefin complex and the cyclic alkylvinylsiloxanes is effected under conditions which remove the olefin from the platinum-olefin complex and which results in the formation of a new type of platinum compound organocyclopolysiloxane composition.

The platinum-olefin complexes of Formulas 1 and 2 employed in the practice of the present invention are known in the art and are described in the aforementioned Pat. 3,159,601—Ashby, which is hereby incorporated by reference into the present application to describe such platinum-olefin complexes and their method of preparation. Within the scope of the platinum-olefin complexes of Formulas 1 and 2 are those in which the olefinic portions are derived from ethylene, propylene, the various isomers of butylene, octylene, cyclopentene, cyclohexene, cycloheptene, etc. The preferred specific platinum-olefin complex of the present invention is the platinum-olefin complex within the scope of Formula 1 in which the olefin is derived from ethylene. Such platinum-olefin complex having the formula:

(4) $[PtCl_2 \cdot C_2H_4]_2$

The cyclic vinylalkylpolysiloxanes within the scope of Formula 3 are also well known in the art and include materials in which the lower alkyl radical represented by R is methyl, ethyl, propyl, butyl, heptyl, etc. radicals. In the preferred embodiment of my invention, the alkyl radical represented by R is methyl. Preferably, also, the preferred value of $n$ is equal to 4 and the preferred specific cyclopolysiloxane employed in the practice of the present invention is the cyclic tetramer of methylvinylsiloxane (1,3,5,7 - tetramethyl - 1,3,5,7 - tetravinylcyclotetrasiloxane).

The catalyst compositions of the present invention are prepared by heating a mixture of the platinum chloride-olefin complex and the cyclic vinylalkylpolysiloxane at a temperature and for a time sufficient to remove the olefin portion of the platinum chloride-olefin complex from the reaction mixture. In particular, the reaction is effected by heating at a temperature of at least about 50° C., e.g., from about 50 to 150° C., a mixture of the platinum chloride-olefin complex of Formula 1 or Formula 2 with the cyclopolysiloxane of Formula 3. While the exact mechanism of the reaction between the platinum chloride-olefin complex of Formula 1 or Formula 2 and the cyclopolysiloxane of Formula 3 is not known with certainty, this reaction differs from the reaction involved in the aforementioned copending application of Bruce D. Karstedt in that the ratio of chlorine to platinum does not change during the preparation of the catalyst composition of the present invention. In contrast to this, in the Karstedt application the ratio of chlorine to platinum is significantly reduced.

The proportions of the platinum chloride-olefin complex of Formula 1 or Formula 2 and the cyclopolysiloxane of Formula 3 can vary within wide limits. While the theoretical stoichiometry of the reaction to form the catalyst of the present invention might indicate the desirability of a reaction mixture containing one silicon-bonded vinyl group from the cyclopolysiloxane per olefin group in the platinum chloride-olefin complex, it is found that the catalyst composition of the present invention is best prepared from a reaction mixture employing a substantial excess of the silicon-bonded vinyl groups. In particular, it has been found that the catalyst compositions of the present invention are most conveniently prepared by heating a mixture which contains from about 10 to 300 or more moles of silicon-bonded vinyl groups per mole of olefin in the platinum chloride-olefin complex. This appears to provide an additional quantity of the cyclopolysiloxane to act as a solvent for the reactants and the reaction products used in the formation of the catalyst composition of the present invention, but the presence of the excess amount of the cyclopolysiloxane does not have a deleterious effect on the use of the catalyst composition in subsequent hydrosilation reactions, since the amount of the catalyst employed in such hydrosilation reactions is so minute that the unreacted cyclopolysiloxane does not have a significant or even a measurable effect on the course of the hydrosilation reaction.

When the platinum chloride-olefin complex of Formula 1 or Formula 2 is mixed into the cyclic vinylalkylpolysiloxane of Formula 3 and the reaction mixture is heated, the course of the reaction can be observed by bubbling of the olefin associated with the platinum chloride-olefin complex from the reaction mixture. The reaction temperature is merely maintained at a temperature above the boiling point of the olefin so as to insure removal of the olefin from the reaction mixture during the catalyst preparation. Since the preferred olefins have boiling points below about 150° C., there is no need for conducting the reaction at a reduced pressure. Therefore, the reaction temperature requirements are at a temperature of at least about 50° C., while also being at least as high as the boiling point of the olefin which is a component of the initial platinum chloride-olefin complex. The time required for effecting complete reaction between the platinum chloride-olefin complex and the cyclic vinylalkylpolysiloxane is a function of the particular platinum chloride-olefin complex, the particular cyclopolysiloxane, and the reaction temperature, but generally is of the order of 1 to 2 hours to completely effect the formation of the catalyst composition of the present invention. The final catalyst composition is a solution of the reaction product of the platinum chloride-olefin complex and the cyclic vinylalkylpolysiloxane in an excess of the cyclopolysiloxane.

The siloxane and platinum compound-organopolysiloxane complexes of the present invention can be used in a broad class of hydrosilation reactions involving two different organopolysiloxanes, one of which contains silicon-bonded hydrogen atoms and one of which contains silicon-bonded vinyl or allyl radicals. The organopolysiloxanes containing silicon-bonded hydrogen atoms which are employed in the hydrosilation reaction of the present invention have the formula:

(5) $(R')_a(H)_bSiO_{\frac{4-a-b}{2}}$ where R' is an organic radical attached to silicon through silicon-carbon linkages and free of aliphatic unsaturation, $a$ has a value of from 1.0 to 2.5, inclusive; $b$ has a value of from 0.005 to 2.0, inclusive; and the sum of $a$ plus $b$ is equal to from 1.005 to 3.0, inclusive. Among the organic radicals represented by R' of Formula 5 are monovalent hydrocarbon radicals free of olefinic unsaturation, halogenated monovalent hydrocarbon radicals free of aliphatic unsaturation, and cyanoalkyl radicals. More particularly, radicals represented by R' include alkyl radicals, e.g., methyl, ethyl, propyl, butyl, octyl, etc. radicals; cycloalkyl radicals, e.g., cyclohexyl, cycloheptyl, etc. radicals; aryl radicals, e.g., phenyl, naphthyl, tolyl, xylyl, etc. radicals; aralkyl radicals, e.g., benzyl, phenylethyl, phenylpropyl, etc. radicals; halogenated radicals of the above types including chloromethyl, chloropropyl, chlorophenyl, dibromophenyl, etc. radicals; and cyanoalkyl radicals, e.g., beta-cyanoethyl, gamma-cyanopropyl, beta-cyanopropyl, etc., radicals. Preferably, at least 50% of the R' groups attached to silicon in the organopolysiloxanes of Formula 5 are methyl radicals, with up to 50 mole percent of the R' radicals being phenyl radicals. The polysiloxanes of Formula 5 will often be referred to hereinafter as "organopolysiloxane hydrides."

The organopolysiloxane hydrides which are employed in the practice of the present invention can also be characterized as copolymers containing at least one unit per molecule having the formula:

(6) $(R')_c(H)_dSiO_{\frac{4-c-d}{2}}$ with the remaining siloxane units in the organopolysiloxane having the average formula:

(7) $(R')_mSiO_{\frac{4-m}{2}}$ where R' is as previously defined, $c$ has a value of from 0 to 2, inclusive, $d$ has a value of from 1 to 2, inclusive, and the sum of $c$ plus $d$ is equal to from 1.0 to 3.0, inclusive, and $m$ has a value of from 1.0 to 2.5, inclusive. Within the scope of Formula 6 are siloxane units such as hydrogen siloxane ($HSiO_{1.5}$), methyl hydrogen siloxane units, dimethyl hydrogen siloxane units, and dihydrogen siloxane units ($H_2SiO$). The copolymers containing the siloxane units of Formula 6 and the siloxane units of Formula 7 are present in proportions so as to form an organopolysiloxane hydride within the scope of Formula 5. In general, the copolymers contain from 0.5 to 99.5 mole percent of the siloxane units of Formula 6 with from 0.5 to 99.5 mole percent siloxane units of Formula 5.

The organosiloxane hydrides are well known in the art and include such materials as 1,3-dimethyldisiloxane, 1,1,3-trimethyldisiloxane, 1,1,3,3-tetramethyldisiloxane, as well as higher polymers containing up to 100,000 or more silicon atoms per molecule. Also included within the scope of Formula 5 are cyclic materials, such as the cyclic trimer or cyclic tetramer of methyl hydrogen siloxane.

The organopolysiloxane containing silicon-bonded vinyl or allyl groups which are employed in the practice of the present invention are also well known in the art and are characterized by the formula:

(8) $(R')_a(R'')_bSiO_{\frac{4-a-b}{2}}$ where R', $a$ and $b$ are as previously defined, and R'' is a member selected from the class consisting of vinyl and allyl radicals. These vinyl or allyl-containing organopolysiloxanes, which will often hereinafter be referred to as "unsaturated organopolysiloxanes" can be characterized as copolymers of siloxane units having the formula:

(9) 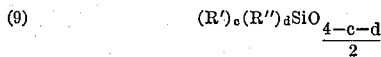

where R', R", c and d and the sum of c plus d is as previously defined, with organosiloxanes having siloxane units within the scope of Formula 7. Where the unsaturated organopolysiloxane is a copolymer of units within the scope of Formula 9 with organopolysiloxane having an average formula within the scope of Formula 7, the copolymer generally contains from 0.5 to 99.5 mole percent of the units of Formula 9 and from 0.5 to 99.5 mole percent of the units within the scope of Formula 7.

The preparation of the unsaturated organopolysiloxanes within the scope of Formula 8 is well known in the art. Included within the scope of the siloxanes of Formula 8 are low molecular weight materials, such as vinylpentamethyldisiloxane, 1,3-divinyltetramethyldisiloxane, 1,1,3-trivinyltrimethyldisiloxane, 1,1,3,3-tetravinyldimethyldisiloxane, as well as higher polymers containing up to 100,000 or more silicon atoms per molecule. Also included within the scope of the unsaturated organopolysiloxanes within the scope of Formula 8 are cyclic materials containing silicon-bonded vinyl or silicon-bonded allyl radicals, such as the trimer, tetramer, or pentamer, of methylvinylsiloxane or methylallylsiloxane.

In carrying out the hydrosilation reaction of the present invention, the platinum compound organocyclopolysiloxane catalyst composition, the unsaturated organopolysiloxane, and the organopolysiloxane hydride are merely mixed together in the desired proportions and maintained at the reaction temperature for a time sufficient to allow reaction to be completed. The proportions of the various ingredients employed in the practice of the invention can vary within extremely wide limits and these proportions of the ingredients are not affected by the stoichiometry of the addition reaction involved since many of the products prepared by the process of this invention exhibit satisfactory properties for intended purposes even when the final product contains unreacted silicon-bonded vinyl or allyl radicals or contains unreacted silicon-hydrogen linkages. However, for economic reasons, it is generally preferred that the unsaturated organopolysiloxane and the organopolysiloxane hydride be present in such proportions that the reaction mixture contains from about 0.05 to 20 silicon-hydrogen linkages per silicon-bonded vinyl or allyl group. Often it is desirable to have an equal number of silicon-hydrogen linkages and vinyl or allyl radicals in the reaction mixture so as to produce a final product which will be substantially free of either silicon-hydrogen linkages or silicon-bonded vinyl or allyl radicals, other than the insignificant proportion of such silicon-bonded vinyl radicals which might be introduced into the reaction mixture in the cyclic vinylalkylpolysiloxane which acts as a solvent for the catalyst complex.

The platinum compound organocyclopolysiloxane catalyst composition is generally added to the reaction mixture in an amount related to the amount of silicon-bonded vinyl or allyl radicals in the unsaturated organopolysiloxane. One especially desirable feature of the process of the present invention is that the catalyst composition can be added in relatively minute quantities and still act satisfactorily as a catalyst for the addition of silicon-hydrogen linkages to vinyl or allyl radicals. Thus, satisfactory reaction can occur when the catalyst composition is present in an amount sufficient to provide as little as one atom of platinum per million silicon-bonded vinyl or allyl groups in the unsaturated organopolysiloxane. Amounts of catalyst composition sufficient to provide as high as one platinum atom per thousand silicon-bonded vinyl or allyl radicals can be employed. In general, it is preferred to employ the catalyst composition in an amount sufficient to provide one platinum atom per 1,000 to one platinum atom per 100,000 silicon-bonded vinyl or allyl groups in the unsaturated organosiloxane.

The characteristics of the products prepared by the process of the present invention can vary greatly with the nature of the starting materials. For example, when the reaction mixture comprises vinylpentamethyldisiloxane and pentamethyldisiloxane, the reaction product is a material containing two disiloxane units joined by a silethylene group. In the case of a reaction mixture which contains a compound such as 1,1,3,3-tetramethyldisiloxane and a high molecular weight organopolysiloxane containing a plurality of silicon-bonded vinyl or allyl groups per molecule, the resulting product is a cross-linked silicone.

The process of the present invention is unique as compared with most platinum catalyst silylation reactions in that the catalyst, the organopolysiloxane hydride, and the unsaturated organopolysiloxane can be mixed together and left at room temperature, i.e., a temperature of from about 20 to 30° C., for an extended period of time. In order to effect the hydrosilation reaction, the reaction mixture is then merely heated to the reaction temperature and maintained at the reaction temperature for a time sufficient to complete the hydrosilation reaction. In general, the rate of reaction is a function of the reaction temperature but, below a temperature of about 50° C., the rate of hydrosilation reaction is so low that no purpose would be served by the use of such temperatures. On the other hand, at about 50° C., the platinum cyclopolysiloxane complex appears to become activated and the reaction proceeds at a rapid rate, with the rate increasing with temperature and increasing with an increasing concentration of catalyst in the reaction mixture.

The following examples are illustrative of the practice of my invention and are not intended for purposes of limitation. All parts are by weight.

EXAMPLE 1

A platinum compound organocyclopolysiloxane catalyst composition within the scope of the present invention was prepared by adding 4.5 parts of a platinum chloride-ethylene complex having the formula:

to 295.5 parts of 1,3,5,7-tetramethyl-1,3,5,7-tetravinyl-cyclotetrasiloxane. The reaction mixture was mixed for about 30 minutes until the platinum chloride-ethylene complex was dissolved in the cyclotetrasiloxane and then the reaction mixture was heated at 60° C. for one hour. During the initial 30 to 40 minutes of the heating at 60° C., copious gas evolution was observed. This gas was collected and identified as ethylene and the amount collected was substantially equal to the amount expected from decomposition of the platinum chloride-ethylene complex. The final catalyst was a colorless liquid which contained 1% by weight platinum and two chlorine atoms per platinum atom. This catalyst composition within the scope of the present invention contained approximately 230 moles silicon-bonded vinyl groups per platinum atom.

EXAMPLE 2

To a mixture of (A) 675 parts of a vinyldimethyl chain-stopped dimethylpolysiloxane fluid having a viscosity of about 4,000 centistokes at 25° C. and (B) 225 parts of a copolymer consisting of trimethylsiloxane units, $SiO_2$ units and methylvinylsiloxane units with the various units being present in an amount sufficient to provide 0.8 trimethylsiloxane units per $SiO_2$ unit and the methylvinylsiloxane units being present in an amount such that 7.0 mole percent of the silicon atoms were present as methylvinylsiloxane units and the remaining silicon atoms were present as a portion of a trimethylsiloxane unit or as an $SiO_2$ unit was added (C) a sufficient amount of the platinum catalyst composition prepared in Example 1 to provide 10 parts per million platinum by weight. To the mixture described above was then added (D) 45 additional parts of the vinyldimethyl chain-stopped dimethylpolysiloxane fluid and (E) 45 parts of a copolymer consisting of two dimethyl hydrogen siloxane units per SiO$_2$ unit. This copolymer had a viscosity of 10 centistokes. A portion of this reaction mixture was then heated for 4 hours at 150° F. to produce a clear silicone elastomer having a tensile strength of 900 p.s.i., an elongation of 170%, and a Shore A hardness of 37. Another sample of this catalyzed composition was kept at 25° C. for over one week and remained a liquid. When this stored sample was heated at 150° F., it cured in a similar fashion to the one cured above.

EXAMPLE 3

To a reaction mixture containing 840 parts of the dimethylvinyl chain-stopped dimethylpolysiloxane fluid of Example 2 was added 0.4 part of the catalyst composition of Example 1, which was sufficient to provide 5 parts per million by weight platinum. This mixture was added to 40 parts of the dimethyl hydrogen-containing copolymer of Example 2. After thoroughly mixing the reactants, the reaction mixture was heated at 150° F. to form a soft, transparent gel useful in damping applications.

EXAMPLE 4

To 4,000 parts of an unsaturated organopolysiloxane was added 8 parts of the catalyst solution of Example 1. The unsaturated organopolysiloxane consisted of a mixture of 6,000 parts of a dimethylvinyl chain-stopped dimethylpolysiloxane having a viscosity of 500,000 centistokes at 25° C. and 2,000 parts of the unsaturated resin of Example 2. The resulting solution had a viscosity of 380,000 centistokes at 25° C. To this catalyzed unsaturated organopolysiloxane was added a solution of 260 parts of the dimethyl hydrogen siloxane copolymer of Example 2 and 260 parts of the dimethylvinyl chain-stopped fluid described above. This reaction mixture was maintained for 4 hours at 150° F. and cured to a clear silicone rubber having a tensile strength of 810 p.s.i., an elongation of 600%, and a Shore A hardness of 45 and a tear strength of 80 lbs./inch.

EXAMPLE 5

A catalyzed unsaturated organopolysiloxane was prepared by adding 0.4 part of the catalyst solution of Example 1 to 400 parts of a dimethylvinyl chain-stopped copolymer of diphenylsiloxane units and methylvinylsiloxane units in which 5.3 mole percent of the silicon atoms were substituted with 2 silicon-bonded phenyl groups. To 50 parts of this unsaturated organopolysiloxane and catalyst was added a solution of 0.75 part of the dimethyl hydrogen siloxane copolymer described in Example 2 in 0.75 part of the above described unsaturated organopolysiloxane fluid. The resulting catalyzed composition was heated for one hour at 100° C., during which the liquid material was converted to a firm gel having a tensile strength of 80 p.s.i., an elongation of 200%, and a Shore A hardness of 26.

EXAMPLE 6

A mixture was prepared from (A) 400 parts of a 600 centistoke dimethylvinyl chain-stopped dimethylpolysiloxane fluid, (B) 200 parts of a trimethylsilyl chain-stopped copolymer having a viscosity of 100 centistokes at 25° C., and containing 1.5 mole percent methylvinylsiloxane units, with the remainder of the difunctional units being dimethylsiloxane units, (C) 200 parts of a resinous copolymer of trimethylsiloxane units and SiO$_2$ units containing 0.50 trimethylsiloxane units per SiO$_2$ unit and (D) sufficient of the catalyst of Example 1 to provide 10 parts per million platinum. The viscosity of this mixture was 500 centistokes at 25° C. To 10 parts of this mixture was added (E) 1 part of the dimethyl hydrogen siloxane copolymer of Example 2 and the resulting mixture was heated for one hour at 100° C. to produce a cross-linked gel having a tensile strength of 130 p.s.i., and elongation of 80%, a Shore A hardness of 30, and a Bashore resiliency of 21.

EXAMPLE 7

An unsaturated organopolysiloxane solution was prepared by mixing 675 parts of a dimethyl vinyl chain-stopped dimethylpolysiloxane fluid having a viscosity of 3800 centistokes and 225 parts of the trimethylsiloxane-SiO$_2$-methylvinylsiloxane copolymer of Example 2. This mixture was then mixed with 450 parts of a finely divided diatomaceous earth having an average particle size of 5 microns and 10 parts of a finely divided carbon black. Sufficient amount of the catalyst solution of Example 1 was added to this mixture to provide 10 parts per million platinum and then 45 parts of a solution of the dimethyl hydrogen siloxane copolymer of Example 2 and 45 parts of the above dimethylvinyl-stopped fluid was added. This mixture was heated for 4 hours at 1500 C. to produce a black, filled silicone rubber having a tensile strength of 835 p.s.i., an elongation of 130%, and a Shore A hardness of 58.

EXAMPLE 8

A platinum chloride organocyclopolysiloxane catalyst composition of the present invention was prepared by adding 3.6 parts of a platinum-chloride cyclohexene complex having the formula:

$$[PtCl_2 \cdot C_6H_{10}]_2$$

to 196.4 parts of 1,3,5-triethyl-1,3,5-trivinylcyclotrisiloxane and heating the reaction mixture at a temperature of 70° C. for 6 hours. During this time, hexene was bubbled from the reaction mixture and was collected. This cyclohexene was present in the theoretical amount expected. The chlorine to platinum ratio of the catalyst composition remained at 2.0. This catalyst composition contained 1 percent platinum. To 200 parts of a methylvinylpolysiloxane having a viscosity of about 200 centistokes at 25° C. and containing 1.0 mole percent methylvinylsiloxane units. 1.0 mole percent dimethylvinylsiloxane units and 98 mole percent dimethylsiloxane units was added 0.2 part of this catalyst composition which was sufficient to provide one atom of platinum for every 4×10$^3$ silicon-bonded vinyl groups. A portion of this catalyzed methylvinylpolysiloxane fluid was mixed with sufficient 1,1,3,3-tetramethyldisiloxane to provide 1.6 silicon-bonded hydrogen atoms per silicon-bonded vinyl group and the reaction mixture was heated at 120° C. for 15 minutes. During this time, the liquid material was converted to a tough, transparent gel.

EXAMPLE 9

A platinum chloride organocyclopolysiloxane catalyst compositions are present in an excess of the cyclic alkyl- was prepared by adding 5.1 parts of a platinum chloride-ethylene complex having the formula:

$$H(PtCl_3 \cdot C_2H_4)$$

to 95 parts of 1,3,5,7-tetramethyl-1,3,5,7-tetravinylcyclotetrasiloxane and heating the reaction mixture at a temperature of 60° C. for 4 hours. During this time, the theoretical amount of ethylene bubbled from the reaction mixture to produce a catalyst within the scope of the present invention. During the ethylene evolution, the ratio of chlorine to platinum remained at 3 atoms of chlorine per atom of platinum. This catalyst composition contained 3 percent by weight platinum. To a mixture of equal parts of a methylvinylpolysiloxane and a methyl hydrogen polysiloxane was added a sufficient amount of this catalyst to provide 1.0 atom of platinum per 100 silicon-bonded vinyl groups. Each of the fluids had an initial viscosity of about 200 centistokes at 25° C. The methyl hydrogen polysiloxane was a trimethylsilyl chain-stopped copolymer containing 2.0 mole percent methyl hydrogen siloxane units, with the remainder of the diorganosiloxane units being dimethylsiloxane units. The methylvinylpolysiloxane fluid corresponded to the methyl hydrogen polysiloxane fluid except that it contained 2.0 mole percent methylvinylsiloxane units instead of the 2.0 mole percent methyl hydrogen polysiloxane units. This reaction mixture was heated at a temperature of 150° C. for 7 minutes during which time the solution was converted to a clear, hard gel.

While the foregoing examples have illustrated many of the embodiments of my invention, it is understood that my invention relates broadly to catalyst compositions prepared by reacting a platinum-olefin complex of the type previously described with a cyclic alkylvinylpolysiloxane of the type previously described to produce a new composition in which the ratio of platinum to chlorine remains substantially the same, but in which the olefin is evolved from the reaction mixture. These catalyst compositions are present in an excess of the cyclic alkylvinylpolysiloxane and are used as such as catalysts in various hydrosilation reactions.

The hydrosilation reaction mixtures which are catalyzed by the catalyst compositions of the present invention are used for potting and encapsulating just as are such hydrosilation reaction mixtures prepared with prior art catalyst materials. Thus, these materials can be used as potting compounds for protecting delicate electronic components, can be used as dielectric materials to fill voids in electrical components, can be used to coat surfaces subjected to elevated temperatures, can be used as shock mounting surfaces, and for a host of other applications which would be obvious to persons skilled in the art.

What I claim as new and desire to secure by Letters Patent of the United States is:

1. Platinum chloride organocyclopolysiloxane catalyst composition prepared by heating a mixture consisting of a platinum chloride-olefin complex having a formula selected from the class consisting of $$[PtCl_2 \cdot Olefin]_2$$

and $$H[PtCl_3 \cdot Olefin]$$

with a cyclic alkylvinylpolysiloxane having the formula:

$$[(CH_2{=}CH)(R)SiO]_n$$

where the olefin is a member selected from the class consisting of alkenes having from 2 to 5 carbon atoms, cycloalkenes having from 5 to 7 carbon atoms, and styrene, R represents a lower alkyl radical and $n$ is an integer equal to from 3 to 5, inclusive, at a temperature of at least about 50° C. for a time sufficient to remove the olefin of the platinum chloride-olefin complex from the reaction mixture.

2. The catalyst composition of claim 1 in which the platinum chloride-olefin complex has the formula:

$$[PtCl_2 \cdot C_2H_4]_2$$

3. The composition of claim 1 in which the cyclic alkylvinylpolysiloxane is 1,3,5,7-tetramethyl-1,3,5,7-tetravinylcyclotetrasiloxane.

4. A composition of claim 1 in which said platinum chloride-olefin complex is a platinum chloride-ethylene complex having the formula:

$$[PtCl_2 \cdot C_2H_4]_2$$

and where said cyclic vinylalkylpolysiloxane is 1,3,5,7-tetramethyl-1,3,5,7-tetravinylcyclotetrasiloxane.

References Cited

UNITED STATES PATENTS

| 3,159,601 | 12/1964 | Ashby. | |
| 3,220,972 | 11/1965 | Lamoreaux | 252—429 XR |
| 3,419,593 | 12/1968 | Willing | 252—429 XR |

PATRICK P. GARVIN, Primary Examiner

U.S. Cl. X.R.

252—431; 260—448.2, 825